United States Patent
Thomas, III et al.

[19]

[11] Patent Number: 6,091,563
[45] Date of Patent: Jul. 18, 2000

[54] LATENT ILLUMINANCE DISCRIMINATION MARKER SYSTEM FOR DATA STORAGE CARTRIDGES

[75] Inventors: Fred C. Thomas, III, Ogden; Glenn B. Dixon, West Point, both of Utah

[73] Assignee: Iomega Corporation, Roy, Utah

[21] Appl. No.: 08/936,970

[22] Filed: Sep. 26, 1997

[51] Int. Cl.⁷ .......................... G11B 19/02; G11B 33/10
[52] U.S. Cl. ........................ 360/69; 360/132; 369/291
[58] Field of Search ........................... 360/69, 132, 133; 369/291

[56] References Cited

U.S. PATENT DOCUMENTS

| | | | |
|---|---|---|---|
| 3,207,910 | 9/1965 | Hirschfeld et al. | 250/226 |
| 3,412,245 | 11/1968 | Halverson | 250/71 |

(List continued on next page.)

FOREIGN PATENT DOCUMENTS

| | | |
|---|---|---|
| 0 716 102 A1 | 6/1996 | European Pat. Off. . |
| 0 802 499 A2 | 10/1997 | European Pat. Off. . |
| 2135059 | 1/1973 | Germany . |
| 29 15 423 A1 | 10/1979 | Germany . |
| 41 24 833 C2 | 9/1993 | Germany . |
| 29 60 7075 U | 8/1996 | Germany . |
| 195 25 677 C1 | 12/1996 | Germany . |
| 4-61650 | 2/1992 | Japan . |
| 4-167286 | 6/1992 | Japan . |
| 6-18540 | 6/1994 | Japan . |

(List continued on next page.)

OTHER PUBLICATIONS

Ryer, A., *Light Measurement Handbook*, Index, http://www.intl-light.com/handbook, 1997–1998, 3 pages.
Ryer, A., "The Power of Light", *Light Measurement Handbook*, http://www.intl-light.com/handbook/ch02.html, 1997–1998, 4 pages.
Ryer, A., "Measurement Geometries", *Light Measurement Handbook*, http://www.intl-light.com/handbook/ch07.html, 1997–1998, 10 pages.

(List continued on next page.)

*Primary Examiner*—William Klimowicz
*Attorney, Agent, or Firm*—Woodcock Washburn Kurtz MacKiewicz & Norris LLP

[57] ABSTRACT

A data storage cartridge for a data storage disk drive has a latent illuminance marker. A light source illuminates the marker and the marker emits illuminance as phosphorescence. A photosensor detects the emitted illuminance, and the decay time is determined. The decay time is checked to provide identification of different types or generations of data storage cartridges.

22 Claims, 9 Drawing Sheets

U.S. PATENT DOCUMENTS

| | | | |
|---|---|---|---|
| 3,444,517 | 5/1969 | Rabinow | 340/146.3 |
| 3,468,046 | 9/1969 | Makishima | 40/2.2 |
| 3,473,027 | 10/1969 | Freeman et al. | 250/71 |
| 3,483,388 | 12/1969 | Ogle et al. | 250/219 |
| 3,513,320 | 5/1970 | Weldon | 250/219 |
| 3,522,432 | 8/1970 | Ortlieb | 250/71 |
| 3,614,430 | 10/1971 | Berler | 250/71 R |
| 3,654,463 | 4/1972 | Geusic et al. | 250/71 R |
| 3,718,078 | 2/1973 | Plummer | 359/742 |
| 3,738,299 | 6/1973 | Packler et al. | 112/439 |
| 3,760,161 | 9/1973 | Lohne et al. | 235/61.11 E |
| 3,830,682 | 8/1974 | Rowland | 161/2 |
| 3,894,164 | 7/1975 | Dismukes et al. | 427/70 |
| 4,019,060 | 4/1977 | Woodman | 250/461 R |
| 4,047,033 | 9/1977 | Malmberg et al. | 250/341 |
| 4,058,732 | 11/1977 | Wieder | 250/461 B |
| 4,146,792 | 3/1979 | Stenzel et al. | 250/365 |
| 4,211,813 | 7/1980 | Gravisse et al. | 428/263 |
| 4,297,584 | 10/1981 | Buchanan et al. | 250/483 |
| 4,374,328 | 2/1983 | Tekippe et al. | 250/458.1 |
| 4,387,112 | 6/1983 | Blach | 427/7 |
| 4,442,170 | 4/1984 | Kaule et al. | 428/333 |
| 4,451,521 | 5/1984 | Kaule et al. | 428/199 |
| 4,485,308 | 11/1984 | Rabatin | 250/461.1 |
| 4,533,244 | 8/1985 | Kaule et al. | 356/71 |
| 4,571,085 | 2/1986 | Anderson | 356/445 |
| 4,633,451 | 12/1986 | Ahn et al. | 369/14 |
| 4,650,320 | 3/1987 | Chapman et al. | 356/71 |
| 4,791,310 | 12/1988 | Honig et al. | 250/458.1 |
| 4,839,092 | 6/1989 | Lindmayer | 252/301.4 S |
| 4,866,694 | 9/1989 | Korth | 369/110 |
| 4,908,516 | 3/1990 | West | 250/356 |
| 4,915,982 | 4/1990 | Lindmayer | 427/69 |
| 5,029,034 | 7/1991 | Weiley | 360/132 |
| 5,038,359 | 8/1991 | Pepper et al. | 359/529 |
| 5,042,020 | 8/1991 | Endo | 369/44.31 |
| 5,210,411 | 5/1993 | Oshima et al. | 250/271 |
| 5,220,166 | 6/1993 | Takeuchi et al. | 250/271 |
| 5,270,854 | 12/1993 | Lee et al. | 359/359 |
| 5,289,451 | 2/1994 | Ashinuma et al. | 369/58 |
| 5,325,243 | 6/1994 | Rath et al. | 360/71 |
| 5,329,127 | 7/1994 | Becker et al. | 250/459.1 |
| 5,351,268 | 9/1994 | Jensen et al. | 374/131 |
| 5,414,266 | 5/1995 | Sun | 250/459.1 |
| 5,418,371 | 5/1995 | Aslund et al. | 250/458.1 |
| 5,418,855 | 5/1995 | Liang et al. | 380/23 |
| 5,463,212 | 10/1995 | Oshima et al. | 235/468 |
| 5,471,281 | 11/1995 | Hayashi et al. | 155/201 |
| 5,491,586 | 2/1996 | Phillips | 359/529 |
| 5,495,466 | 2/1996 | Dohmeier et al. | 369/275.4 |
| 5,525,798 | 6/1996 | Berson et al. | 250/271 |
| 5,548,106 | 8/1996 | Liang et al. | 235/454 |
| 5,574,790 | 11/1996 | Liang et al. | 380/23 |
| 5,576,110 | 11/1996 | Lin et al. | 428/447 |
| 5,604,006 | 2/1997 | Ponchaud et al. | 428/67 |
| 5,608,225 | 3/1997 | Kamimura et al. | 250/458.1 |
| 5,611,958 | 3/1997 | Takeuchi et al. | 252/301.4 P |
| 5,638,228 | 6/1997 | Thomas, III | 360/60 |
| 5,668,363 | 9/1997 | Nishida et al. | 235/468 |
| 5,745,460 | 4/1998 | Tateishi | 369/58 |
| 5,745,461 | 4/1998 | Kawasaki | 369/58 |
| 5,790,489 | 8/1998 | O'Connor | 369/52 |
| 5,949,539 | 9/1999 | Britton, Jr. et al. | 356/317 |

FOREIGN PATENT DOCUMENTS

| | | |
|---|---|---|
| 1 232 570 | 5/1971 | United Kingdom . |
| 2018984 | 10/1979 | United Kingdom . |
| 2 095 822 | 10/1982 | United Kingdom . |
| WO 95/19605 | 7/1995 | WIPO . |
| WO 97/10307 | 3/1997 | WIPO . |

OTHER PUBLICATIONS

Internet pages regarding "irradiation", 1 page; "irradiance", 1 page; "radiant power", 1 page; "radiant energy", 1 page, "time", 1 page, "time scale", 1 page; and "Spectral Irradiance", 1 page.

Saleh, B.E. et al., *Fundamentals of Photonics*, John Wiley & Sons, Inc., 454–457.

Kuchling, H., *Taschenbuch der Physik*, Verelag Harri Deutsch, 1979, 363–364.

Patent Abstracts of Japan, vol. 18(85), published Feb. 1994, Appl'n No. 4–113,999, Sugarawa Jacobs, S.F., "Experiments with retrodirective arrays", *Optical Engineering*, 1982, 21(2), 281–283.

Rennilson, J. "Retroreflection–What is it and how is it used?", *ASTM Standardization News*, Feb. 1982, 3 pages.

Venable, Jr. et al., "Factors affecting the metrology of retroreflecting materials", *Applied Optics*, 1980, 19(8), 1242–1246.

Walker, J. "The Amateur Scientist: Wonders with the retroreflector, a mirror that removes distortion from a light beam", *Scientific American*, 1988, 258(1), 118–123.

Reflexite Corporation Brochure NA1010, "Reflectors for Photoelectric Controls", Apr. 1993, 4 pages.

Lerner, J.S., Shie, R., Petersen, J., "Holographic Light Shaping Diffusers", presented at The Aerospace Lighting Institute, Advanced Seminar, Feb. 1994, Los Angeles, CA, 4 pages.

Physical Optics Corporation Brochure JL1–493, "Light Shaping Diffusers", 2 pages.

The Optometrics Group Catalog, "Optical Components & Instruments Catalog—Gratings", 1996, 28–35.

Kathman, A. et al., "Binary Optics: New Diffractive Elements for the Designer's Tool Kit", The Photonics Design & Applications Handbook®, Laurin Publishing Co., Inc., 1994 (Book 3), H358–H360.

Loewen, E.G., "Diffraction Gratings: Selection of Size and Type for Different Applications", The Photonics Design & Applications Handbook®, Laurin Publishing Co., Inc., 1994 (Book 3), H362–H365.

Faklis, D. et al., "Optical Design/Diffractive Lenses: Taking Advantage of Diffractive Optics to Reduce Size, Weight and Cost", The Photonics Design & Applications Handbook®, Laurin Publishing Co., Inc., 1994 (Book 3), H386–H390.

Lockyer et al., "Photonics vs. Counterfeiters", *Photonics Spectra*, Nov. 1996, 70–82.

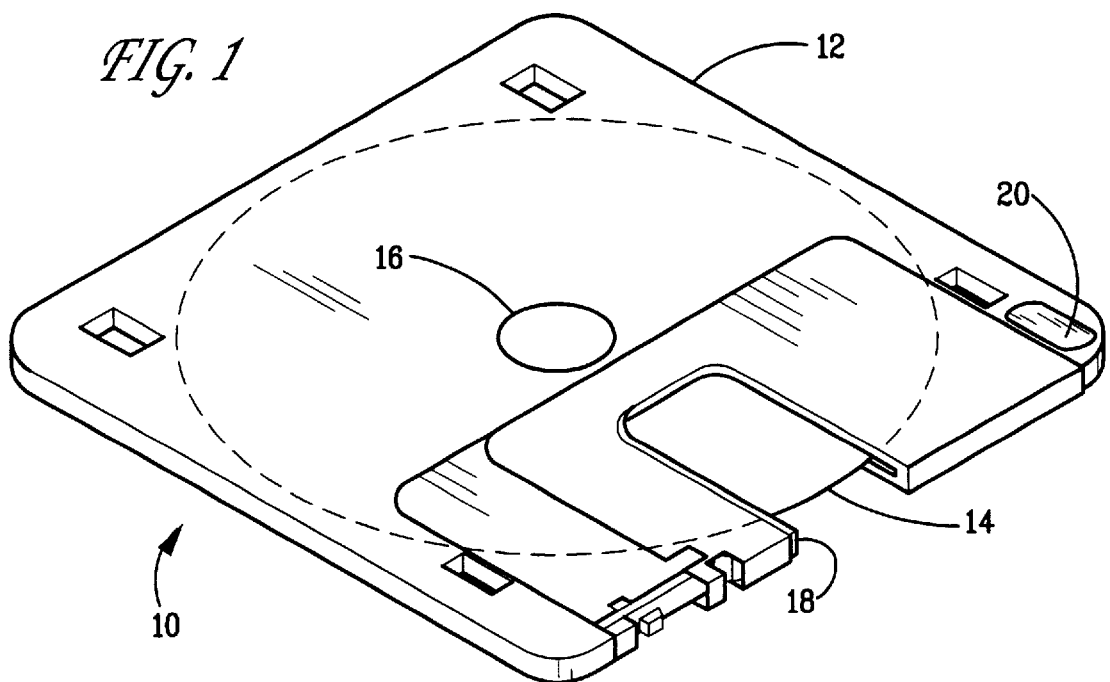
FIG. 1
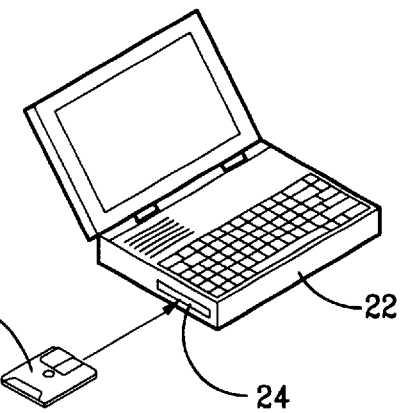
FIG. 2
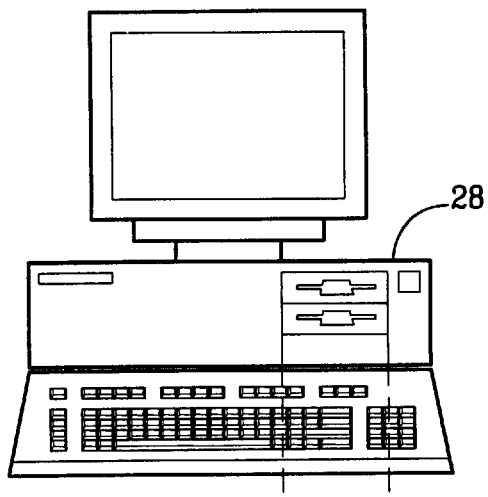
FIG. 3
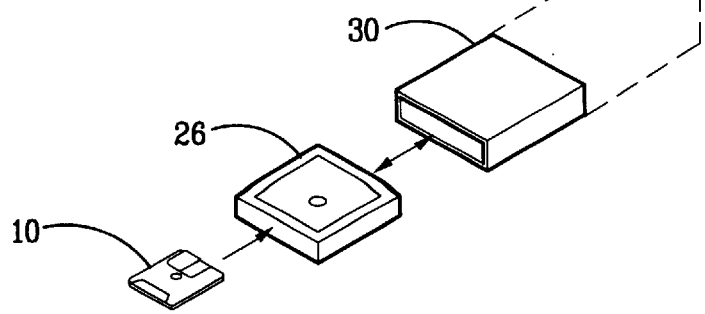

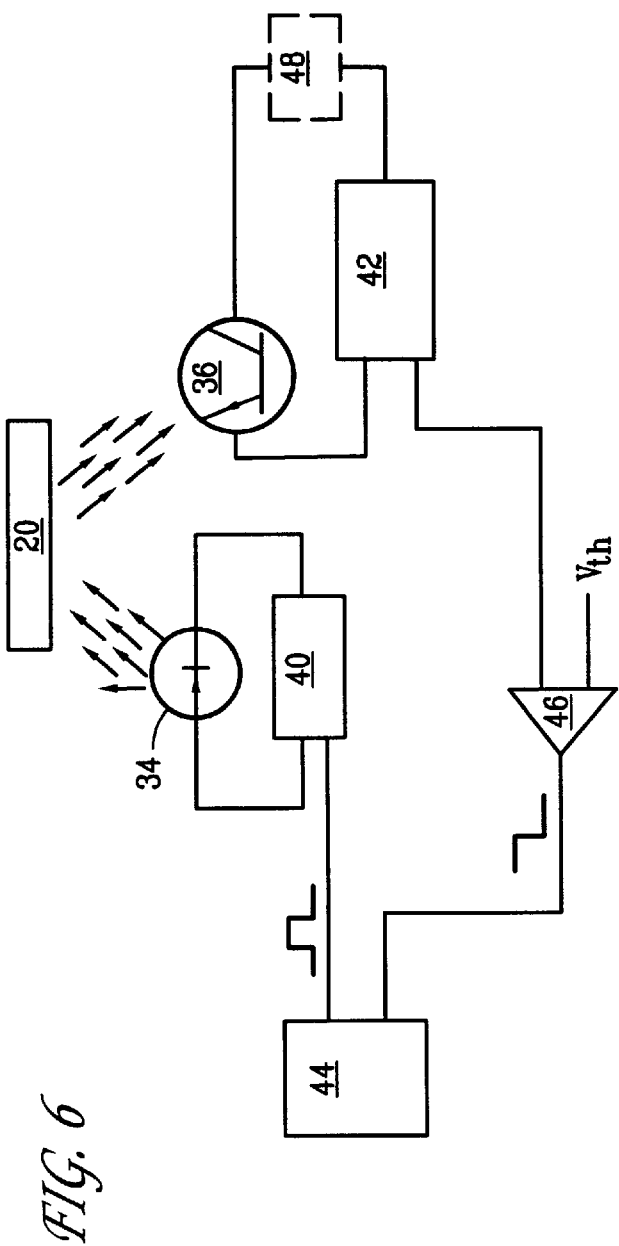
FIG. 6
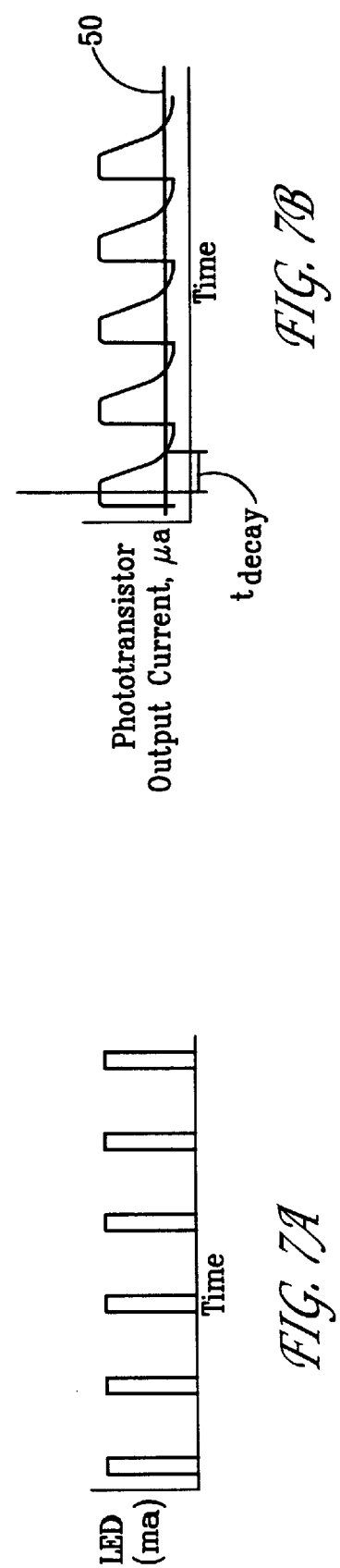
FIG. 7B
FIG. 7A

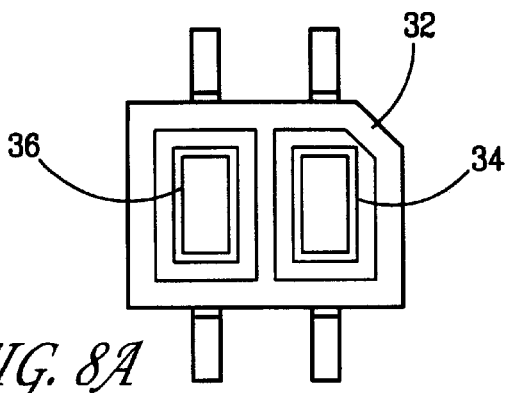
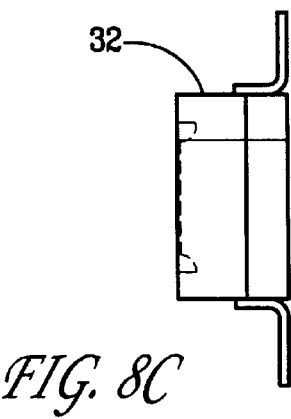
FIG. 8A
FIG. 8C
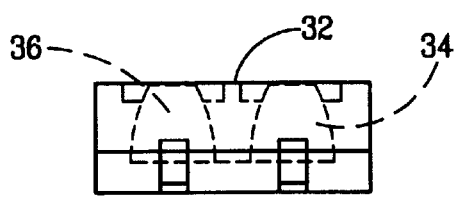
FIG. 8B
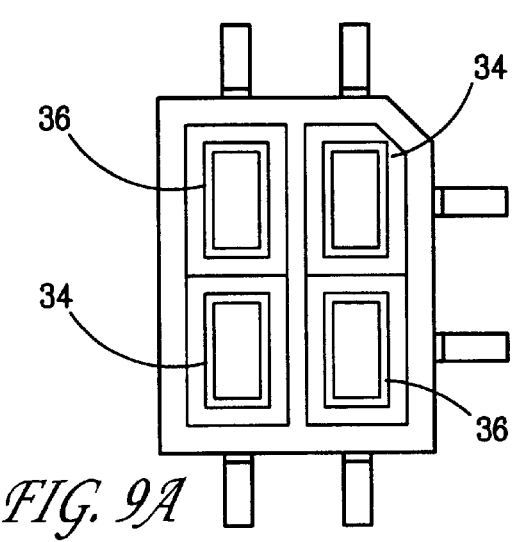
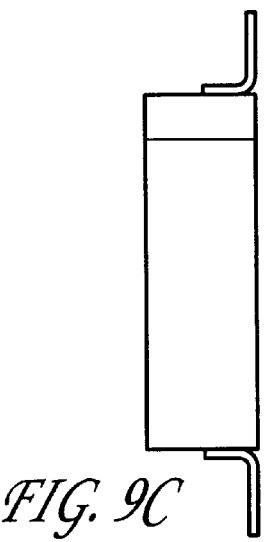
FIG. 9A
FIG. 9C
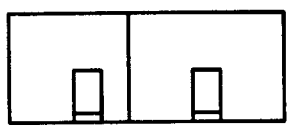
FIG. 9B
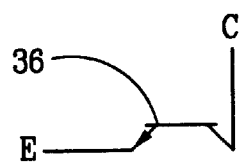
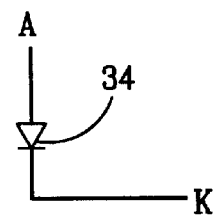
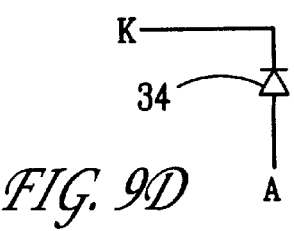
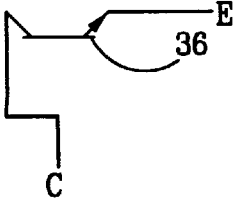
FIG. 9D 6,091,563

LATENT ILLUMINANCE DISCRIMINATION MARKER SYSTEM FOR DATA STORAGE CARTRIDGES

FIELD OF THE INVENTION

The present invention relates in general to a marker for identifying an object in a system which includes a source of irradiance and a detector of light reflected from the marker. More particularly, the present invention relates to a removable data storage cartridge and to a data storage drive for receiving the cartridge. Even more particularly, the present invention relates to detecting the presence of the correct disk cartridge in the data storage drive by use of a latent illuminance tag on the cartridge.

BACKGROUND OF THE INVENTION

Disk drives for receiving removable disk cartridges, including conventional 3.5 inch floppy disk drives, must have some mechanism for detecting the insertion or presence of a disk cartridge in the drive. The actuator that carries the recording heads of the disk drive across the recording surfaces of the disk should not be allowed to move unless the presence of a disk cartridge is detected. This feature requires that the disk drive have a cartridge insertion opening into which foreign objects can be inserted. If these objects physically engage the drive as a legitimate cartridge would, then the heads could be loaded onto or into the foreign object, thereby destroying the drive. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

"RETROREFLECTIVE MARKER FOR DATA STORAGE CARTRIDGE", U.S. Pat. 5,638,228, to Thomas, III, describes the reflection of a highly concentrated quasi circular lobe of light whose spread on reflection is captured by the aperture of a phototransistor in close proximity to a light emitting diode (LED). This emitter/detector pair is in the drive and a retroreflective array is on the cartridge. The desired light lobe size is provided by the geometric size of the retroreflector array elements relative to the spacing of the emitter and the detector in the drive. Due to this physical size matching and the fact that retroreflectors are used, this marker on the cartridge is quite insensitive to cartridge tilt and distance from the emitter/detector pair in the drive. This patent is incorporated herein by reference.

Recently, very small mini-cartridges have been developed for use in miniature disc drives. These mini-drives are incorporated into hand-held devices such as digital cameras, electronic books, global positioning systems, cellular phones and the like. "INTERCHANGEABLE CARTRIDGE DATA STORAGE SYSTEM FOR DEVICES PERFORMING DIVERSE FUNCTIONS", Ser. No. 08/746,085, filed Nov. 6, 1996, Edwards, et al. (Attorney's Docket IOM-9319) describes such mini-cartridges, mini-drives, and hand-held devices. This application is incorporated herein by reference.

The mini-cartridge's data storage disk has a total thickness of about 2.5 mm. As disk storage products become smaller and smaller, the need for a cartridge marker of thinner physical size is required. The aforementioned mini-cartridge has such a requirement. In very thin disk drives where the distance between the cartridge tag and the optical sensing device is very small (e.g., 1 mm), the inherent reflective gain mechanism obtained with a retroreflector over a diffuse or specular reflector is lost. Holographic directional light control is possible, but due to the very small working distances the ability for false engagement of the drive is significantly increased with that approach.

The ability to discriminate between cartridge types after insertion into a data storage device but prior to putting the read/write heads on the recording media is of significant value and utility. Principally this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations. The ability of a disk drive to predetermine the type/generation of data storage cartridge inserted into it prior to enabling the spin-up and engagement of read/write elements also provides the drive system designer with new possibilities for cross-platform interchangeability.

A "caddy" cartridge, as mentioned in the aforementioned Edwards, et al. application provides cross drive platform compatibility, for example between mini-cartridges and personal computer cartridges. The ability to recognize the installation of a "caddy" into the drive prior to spinning up of the "caddy" and loading of heads is necessary. Again rotational speed adjustments, Z track location information, data channel rate and crash stop/ID and OD data track location information must be determined prior to read/write head loading. This invention provides a solution of these problems also.

Another problem associated with the detection of LED light reflected from any reflective material is the occurrence of illuminance hot spots or structure in the LED output which often results in uneven illumination of the cartridge marker. Because these are typically randomly located, the effect on the amplitude of the reflected return is variable.

Recently, in various industries such as the distribution industry, phosphors have been used in the control of goods by means of bar codes, and furthermore, bar codes are printed on various prepaid cards and passing cards, and these bar codes are read by optical reading apparatuses such as scanners to perform the desired actions. Moreover, various attempts have been made to apply forgery preventive means to credit cards and prepaid cards or to detect forged cards. For example, the marks such as bar codes are printed with an ink containing a phosphor by offset printing or by using an ink ribbon to form latent image marks. The latent image marks are irradiated with a semiconductor laser beam to excite the phosphor and the light emitted from the phosphor is received to read the bar code information by an optical reading apparatus. These techniques use the spectral content of the latent illuminance for identification.

Although the art of detecting and discriminating between data storage cartridges is well developed, there remain some problems inherent in this technology, particularly when the distance between the cartridge tag and the optical sensing device is very small (e.g., 1 mm). Therefore, a need exists for a tag that produces reliable detection and discrimination between data storage cartridges when the distance between the cartridge tag and the optical sensing device is very small.

SUMMARY OF THE INVENTION

The present invention is directed to a cartridge for a data storage drive which has a source of irradiance at an irradiance wavelength and a detector of irradiance for determining whether the cartridge is suitable for use in the drive, comprising a body; a data storage medium in the body; and a marker on the body. The marker is a phosphorescent material which absorbs irradiance from the source and emits irradiance having an initial value toward the detector for detection which thereby identifies the cartridge as being suitable for use in that drive.

In a further embodiment within the scope of the present invention, a combination of a data storage drive and a cartridge for the drive comprises, with respect to the drive: a source of irradiance; a detector of irradiance; and means for enabling the drive when the detected irradiance indicates a predetermined decay time, and the cartridge comprises: a body; a data storage medium in the body; and a phosphorescent marker on the cartridge. The detector is connected to enable the means for enabling the disk drive when light from the phosphorescent marker indicates the predetermined decay time. The light has an initial value that is used in determining the decay time.

In the present invention, the source and the detector are closely spaced, the source is an LED, and the detector is a phototransistor. The data storage drive further comprises monitoring means for monitoring the output of the detector and determining the decay time of the phosphorescent marker.

Another embodiment within the scope of this invention includes a method for determining the type of a data storage cartridge for use with a data storage drive, comprising the steps of: inserting the data storage cartridge having a phosphorescent marker into the drive; illuminating the phosphorescent marker for a predetermined time; and monitoring emitted light having an initial value from the phosphorescent marker to determine a decay time. The decay time uniquely identifies the cartridge.

Another embodiment within the scope of this invention is directed to a system for identifying an object by a source of irradiance and a detector of irradiance, the object comprising a body; a marker on the body including a phosphorescent material which emits irradiance from the source toward the detector for detection; and means for monitoring the emitted irradiance from the phosphorescent material to determine a decay time of the phosphorescent material, thereby identifying the object.

The foregoing and other aspects of the present invention will become apparent from the following detailed description of the invention when considered in conjunction with the accompanying drawing.

BRIEF DESCRIPTION OF THE DRAWING

FIG. 1 shows the data storage cartridge of the present invention;

FIG. 2 is a perspective view of a device having a mini-disk drive of the type in which the invention is used;

FIG. 3 shows how the mini-disk drive of FIG. 2 is compatible with a disk drive in a personal computer system;

FIG. 6 shows a block diagram of an exemplary system in accordance with the present invention;

FIGS. 7A and 7B show the time domain operation of an exemplary system in accordance with the present invention;

FIGS. 8A to 8C respectively show top, side and edge views of an emitter/detector pair positioned in the drive to detect the latent illuminance marker;

FIGS. 9A to 9D respectively show top, edge, and side views and an electrical schematic of an emitter/detector system suitable for use in the drives;

Figure 4:
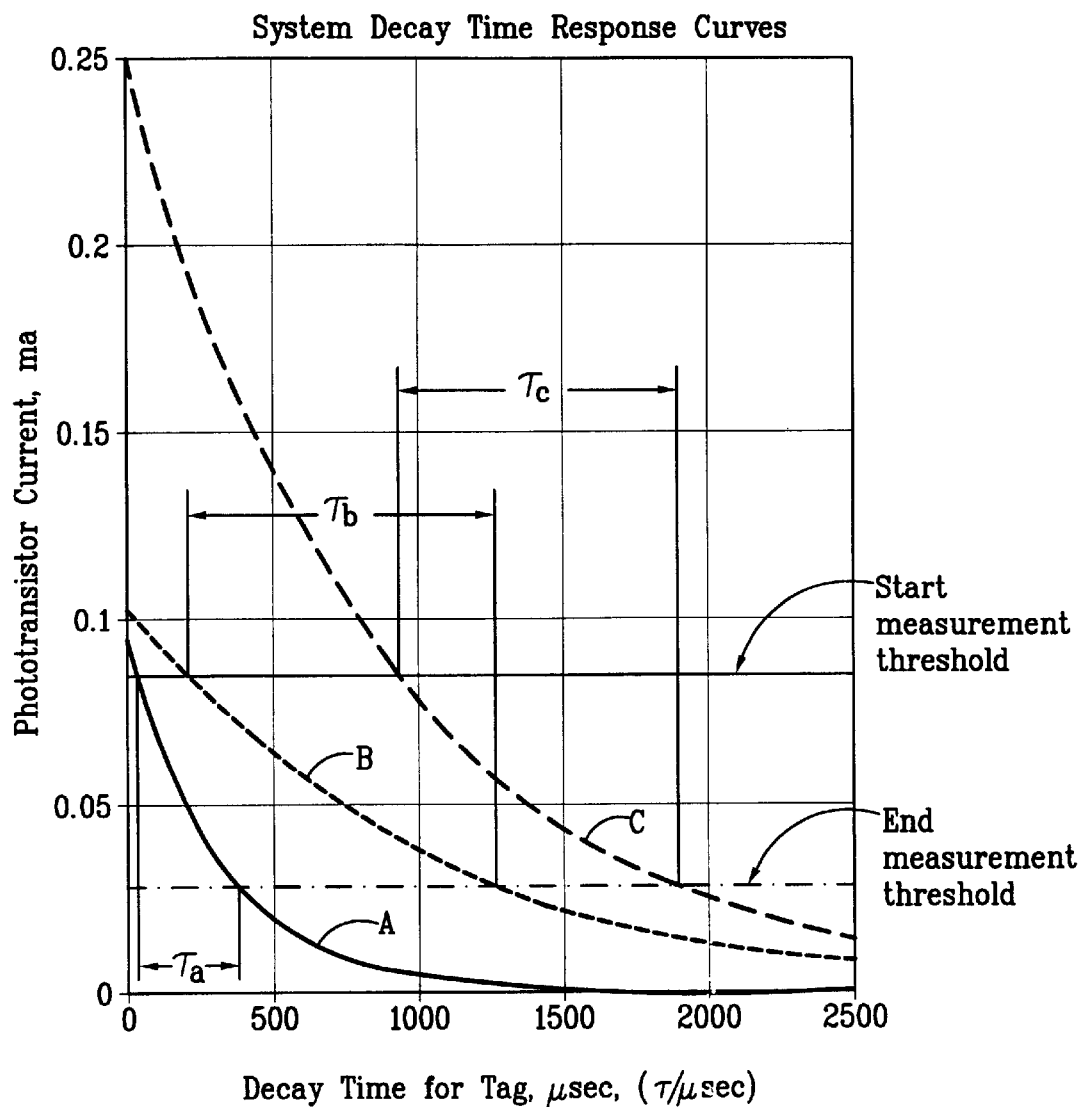
FIG. 4 is a diagram of exemplary decay rates for exemplary tag materials in accordance with the invention.

DESCRIPTION OF EXEMPLARY
EMBODIMENTS AND BEST MODE

The present invention is directed to a latent illuminance marker (hereinafter also referred to as a tag) which is used to identify and discriminate the type of data storage cartridge (hereinafter also referred to as a disk cartridge) that has been inserted into a disk drive. The present invention provides an optical detection mechanism so that it can be ascertained with near certainty that an inserted object is an appropriate disk cartridge. A preferred application for a latent illuminance tag in accordance with the present invention is in very thin disk drives where the distance between the tag, which resides on a disk cartridge, and an optical sensing device is very small (on the order of 1 mm). The tag system is a highly effective discriminant of appropriate cartridge insertion for a disk drive and is used to prevent unauthorized copies of software from being easily reproduced and used in disk drives.

FIGS. 1 to 3 show a cartridge and a disk drive to which the present invention is applicable. The cartridge and drive are described in the co-pending application entitled "INTERCHANGEABLE CARTRIDGE DATA STORAGE SYSTEM FOR DEVICES PERFORMING DIVERSE FUNCTIONS", Ser. No. 08/746,085, filed Nov. 6, 1996 (Attorney Docket No. IOM-9319), which is incorporated herein by reference.

The disk cartridge 10 comprises an outer casing 12 and a disk-shaped recording medium 14 which is affixed to a hub 16 that is rotatably mounted in the casing 12. An opening on the bottom shell of the casing 12 provides access to the disk hub 16.

A head access opening in the front peripheral edge 18 of the disk cartridge 10 provides access to the recording surfaces of the disk by the recording heads of a disk drive.

In accordance with the present invention, a latent illuminance marker, or tag, 20 is positioned on the disk cartridge 10 to be detected by a detector in a disk drive.

FIG. 2 shows a laptop computer 22 which has a mini-disk drive 24 for receiving the disk cartridge 10 of FIG. 1. FIG. 3 shows how a caddy 26 provides forward compatibility to a host computer 28. Caddy 26 adapts the mini-cartridge 10 to a personal computer drive 30. The drive 30 may be the Iomega ZIP drive which is disclosed and claimed in the U.S. patents identified in U.S. Pat. No. 5,638,228.

The latent illuminance marker 20 on the mini-cartridge 10 is desirably very thin in order for the cartridge to fit in the thin form factor of the mini-drive. A phosphorescent material is used in a preferred embodiment of this invention.

The present invention is directed to a latent illuminance tag, preferably phosphorescent, that can be attached to a data storage cartridge as a sticker, or printed onto or molded into a data storage cartridge. On each disk cartridge having an authorized copy of the software, there is a tag which is preferably coated with a phosphorescent photoluminent material which serves to identity the type or generation of disk cartridge.

The phosphor type materials used in the phosphorescent tag fluoresce for a period of time after a light source, preferably an LED, that has illuminated the tag is turned off. This light emission from the tag is called phosphorescence. Thus, the tag will emit illuminance (light) for a period of time after being illuminated with a light source. The decay period for the emitted illuminance ranges from sub-microseconds to several minutes depending on the material that is phosphorescing. The decay time constant used to specify the tag is the time it takes for the latent irradiance to decay to 10% of its initial value. The decay in ir radiance takes the form $e^{-t/(T/2.3)}$ where T is the decay time constant and t is elapsed time from when the charging LED is turned off. FIG. 4 illustrates this decay for three different exemplary tag materials, A, B, and C, as a graph of phototransistor current versus decay time for the tag. As described below, a phototransistor is a preferred detector that is used to detect the emitted illuminance from a tag.

Any phosphor or combination or blend of phosphors can be used as the latent illuminance material in accordance with the present invention. Preferred phosphors include rare-earth phosphors including oxides, oxysulfides, silicates, and alumites as well as other photoluminent materials and compounds. There are many combinational possibilities for photoluminent materials.

The tag is preferably a pressure sensitive adhesive (PSA) sticker. The desired phosphorescent material or compound is preferably suspended in an optically clear epoxy which is coated/printed on the sticker substrate (e.g., white vinyl). PSA with a protective liner is applied to the back side of the sticker substrate.

The compound can alternatively be used as a plastic filler for injection molded parts/tags or blended with inks for printing. Parts requiring identification and discrimination can be either molded, printed onto, or tagged with a phosphorescent material or compound.

It is desirable that with ordinary handling and abrasion the tag will not flake, peel or otherwise be damaged in a manner to adversely affect its performance or generate debris which could adversely affect a disk drive's performance. Moreover, preferably, the tags are operational from −20 to 65° C. (−4 to 149° F.) and have a functional life of at least 15 years. Thus, inorganic phosphors are preferred as the phosphorescent material.

The latent illuminance emitted from the tag is sensed by a photodetector to provide the tag type discrimination and desirably has as high a conversion efficiency as possible. The phototransistor current generated by the latent illuminance is preferably at least 0.1% of the phototransistor current generated by the reflection from a white card. Moreover, the latent illuminance is preferably irradiated from the tag in a diffuse, spherical manner, equal in all directions.

Figure 5A:
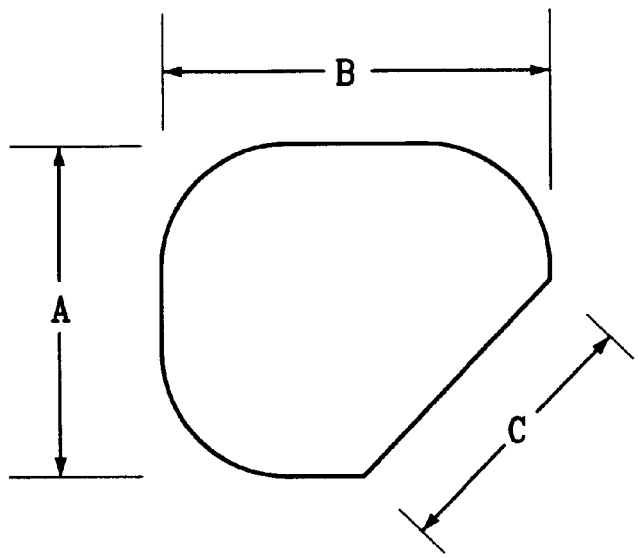
FIGS. 5A and 5B show a plan view and an exploded perspective view, respectively, of one embodiment of the invention.
Figure 5B:
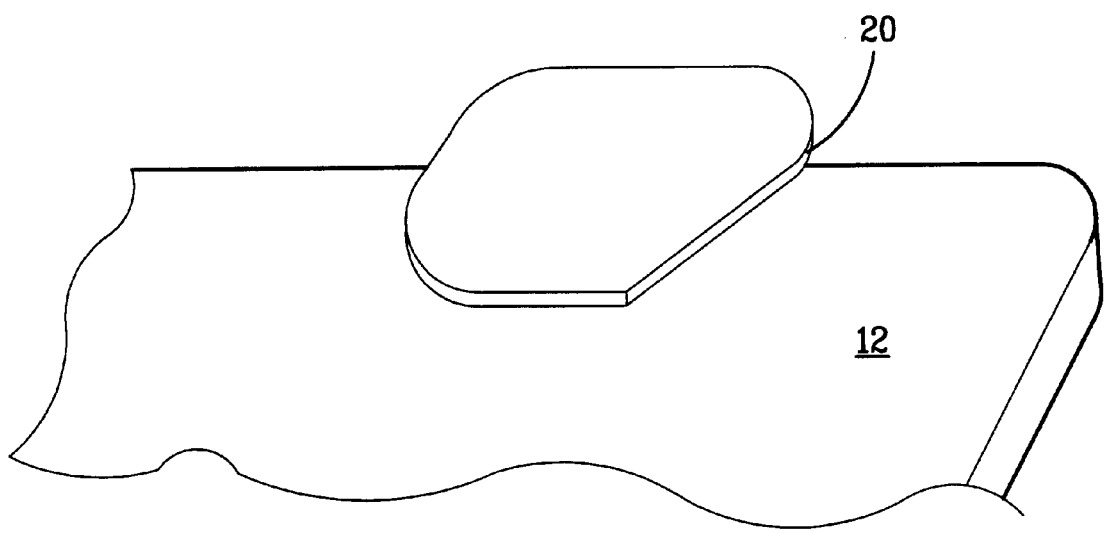

The tag can be any size or shape that fits on the disk cartridge, with the thickness, or ink thickness if printed, preferably less than 0.5 mm and a thickness tolerance of ±0.05 mm. FIG. 5A shows the preferred physical dimensions of the tag implementation for a cartridge application, with dimensions: A equals approximately 4.2 mm, B equals approximately 5.0 mm, and C equals approximately 5.0 mm. The sheet tolerance for the tag illustrated in FIG. 5A is ±10.13 mm. FIG. 5B shows an exploded perspective view of the tag 20 on the outer casing 12 of the disk cartridge.

In a preferred embodiment, the disk drive has an emitter/detector pair that is used for interrogation of the latent illuminance tag. FIG. 6 shows a block diagram of an exemplary system in accordance with the present invention. A light source 34, preferably an LED, illuminates a latent illuminance tag 20. The LED 34 is driven by LED switching and current limiting electronics 40, and a microprocessor 44 which sends pulse commands to the electronics 40. The tag 20 emits illuminance which is detected by a detector 36, preferably a phototransistor. Gain, preferably 100×, is applied to the output of the phototransistor 36 by a gain stage 42. The output of the gain stage 42 is provided to a comparator 46 which compares the emitted illuminance with a threshold Vth. The results of the comparison are provided to the microprocessor 44 which measures the timing, determines the decay rate or time constant, and identifies the disk cartridge for validation. Element 48 contains optional filters that are described below with respect to further embodiments.

More particularly, when a data storage cartridge is inserted into a disk drive, the light source 34, preferably an LED, emits a short intense pulse of light. The light can be one pulse or a continuous cycle of pulses. Moreover, in another exemplary embodiment, the detection circuitry optically pumps the phosphorescent tag with the light source and measures and compares a phase lag between the drive signal and the decay illuminance. This provides a measure of the decay time constant. FIGS. 7A and 7B show an exemplary LED duty cycle and its corresponding latent illuminance decay profile at a phototransistor output, respectively, for a pulsed LED. The bounded decay time, $t_{decay}$, provides the information that is desirably used to discriminate between a plurality of tags. Line 50 shows the threshold for decay time detection.

LEDs are capable of handling large current surges for short periods to generate bright flashes of light. The outputted LED light illuminates the phosphorescent tag 20 and thereby excites atoms or ions which emit light as they decay to lower energy levels. The phosphor type materials used in the phosphorescent tag 20 fluoresce for a period of time after the LED 34 is turned off. The photonic sensor 36 is in close proximity to the LED 34. This sensor 36 is initially saturated by the emitted light from the tag 20. Once the LED 34 is turned off, the disk drive microprocessor 44 or a functionally similar system monitors the output of the photonic sensor 36 and determines the decay time required for the latent illuminance or phosphorescence to fall below a predetermined threshold, preferably 10% of its initial value. The decay time measured by the drive microprocessor 44 provides information by which the drive can determine which generation or type of cartridge has been inserted.

As described, the emitter is a light source, preferably an LED, and the detector is a photosensor or photodetector, preferably a phototransistor. FIGS. 8A to 8C show the layout of a suitable emitter/detector pair 32 which includes LED 34 and phototransistor 36. The tag 20 (shown in FIG. 6) is illuminated with the LED 34, and the output of the phototransistor 36 is sampled at regular time intervals to determine the decay signature or time constant for the decay.

The tag can be illuminated with a single color LED or multiple colors (i.e., two or more colors at the same time), depending on the composition of the phosphorescent compound in the latent illuminance tag. For example, in one embodiment, the emitter is a three color LED which illuminates the latent illuminance tag with three colors, for example, red (630 nm), green (560 nm) and orange (605 nm) wavelengths because the tag comprises at least one phosphor material responsive to one of these wavelengths, and may be a phosphor compound comprising more than one material that is responsive to these wavelengths. Output power of the LED devices while illuminating the latent illuminance tag are preferably in the sub-milliwatt range. The decay signature, or signatures in combination, are used to identify the cartridge as having a valid latent illuminance tag. It should be noted that there are numerous wavelengths of LEDs from the blue to the near-IR in the photonic spectrum that are technologically and economically feasible.

The addition of more than one emitter/detector pair allows for emission and detection of multiple wavelengths or colors from the latent illuminance tag, thereby providing cartridge type discrimination. FIGS. 9A to 9D depict an emitter/detector system which includes two detectors 36 and two emitters 34. FIG. 9D depicts the electrical components with the legends E for emitter, C for collector, A for anode, and K for cathode. The "emitter/detector system" includes two light detectors (phototransistors) 36 which are on orthogonal axes in close proximity to two LED light sources 34.

Figure 10A:
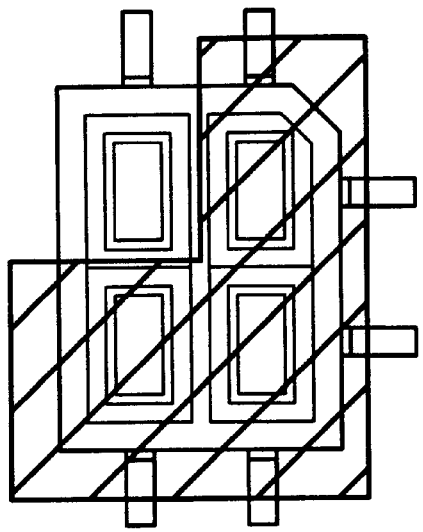
FIGS. 10A to 10D show the descriminatable illuminance states using a LED/detector system such as that of FIGS. 9A to 9D.
Figure 10B:
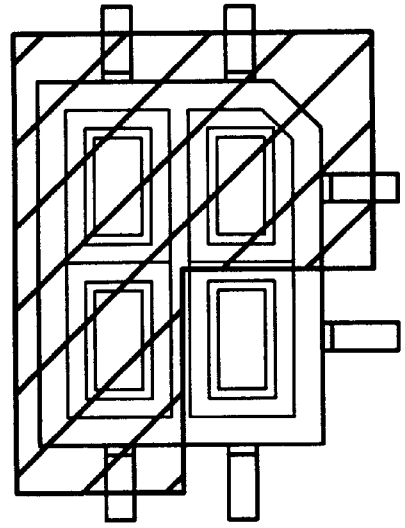
Figure 10C:
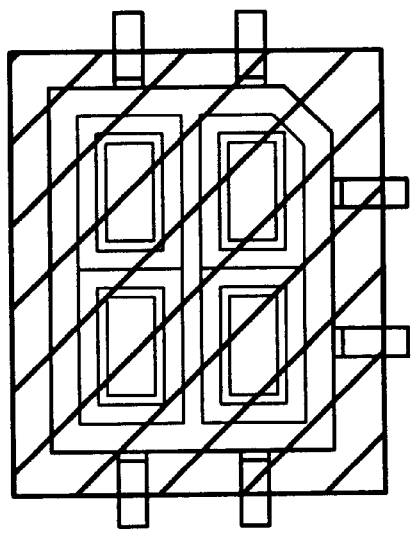
Figure 10D:
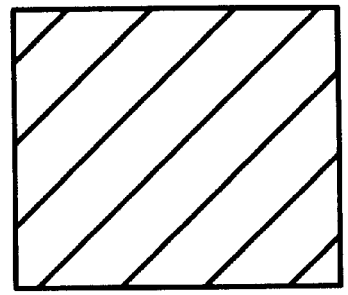

FIGS. 10A to 10D illustrate the three possible detectable or discriminatable states using the two orthogonally placed detectors. State 1 is shown in FIG. 10A, state 2 in FIG. 10B and state 3 in FIG. 10C. FIG. 10D shows the legend for the emitters and detectors that are active in FIGS. 10A to 10C. An example of the application of this three state system would be in a future higher capacity ZIP drive. "State 1" would alert to the insertion of a ZIP 100 cartridge, "State 2" would alert to the insertion of a ZIP 200+ cartridge, and "State 3" would alert to the insertion of a mini-cartridge "caddy".

Addition of a third detector element and a third emitter allows for the detection and discrimination of seven possible states. Any number of multiple arrayed detectors and emitters provide an exponentially increasing number of descriminatable states.

Figure 11A:
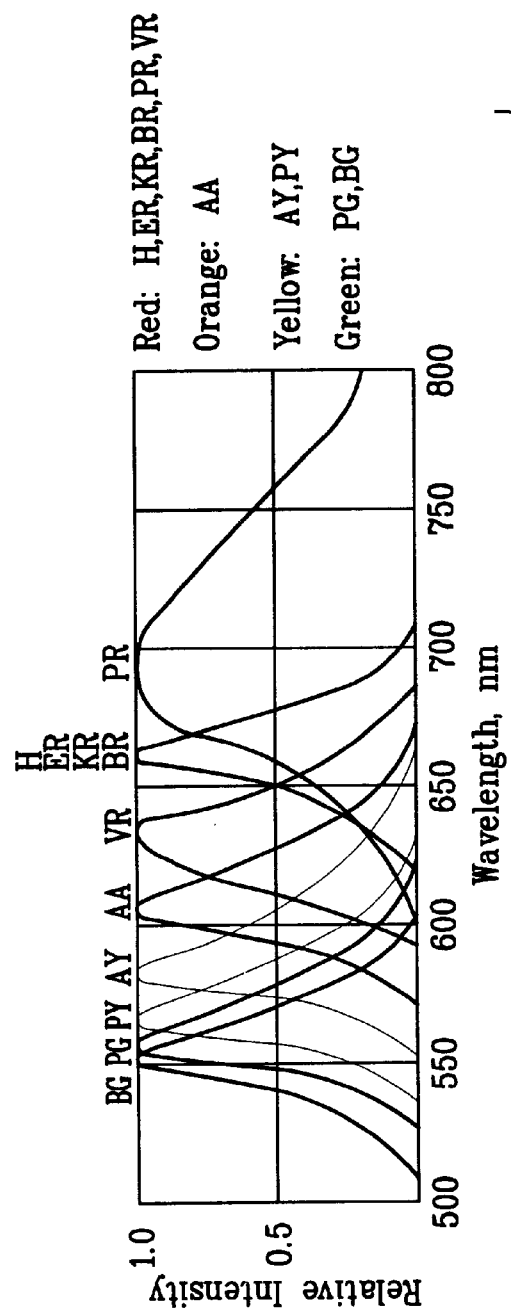
FIGS. 11A and 11B show spectral distribution for typical near-IR LEDs and visible LEDs, respectively.
Figure 11B:
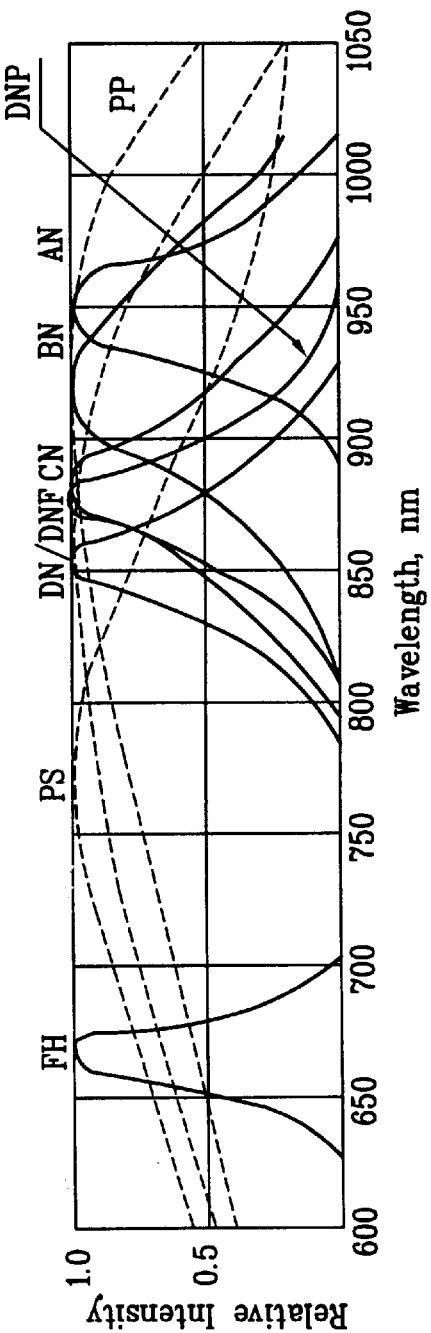

The excitation wavelength for the phosphorescent tag is preferably a standard LED emitting wavelength. Exemplary center wavelengths and their FWHM spectral bandwidths in order of preference are as follows: 950 nm (45 nm), 810 nm (40 nm), 880 (40 nm), and 670 nm (30 nm). FIGS. 11A and B show spectral distribution for typical near-IR LEDs and visible LEDs, respectively, which are also possible excitation sources. It is most preferred that the latent illuminance wavelength be the same as the emitted source.

The distance between the tag and the LED excitation source is preferably about 1.0 mm. At this distance, the power density is, on average over a 2 $mm^2$ area, 300 $\mu$watts/$mm^2$. This power density is obtained using a 1 milliwatt LED source.

In accordance with the present invention, it is desirable to minimize the spin-up time for the disk drive. Minimization of the spin-up time dictates the time duration of excitation irradiance and LED current draw limits. If the cartridge type verification is to take place prior to drive spin-up, the current through the device can be relatively high, but the duration is preferably short to minimize protraction of spin-up time. Alternatively, the excitation and detection process could occur during motor spin-up which takes about a second; however, due to the high current demands of this process, the available current for tag excitation is limited.

The basic preferred specification on these type of LEDs is 30 ma maximum at 50% duty cycle (periods<1 second) or power equivalents. For example, for a 2% duty cycle (on), the LED pulse could be as large as 750 ma. In such a case, the LED current/duration alternatives are preferably 50 ma for 250 msec, or 400 ma for 30 msec.

The time period that the specified power density is provided to charge the tag is preferably the same regardless of the composition of the tag.

Low cost physically compact commercially available packages which include both an LED irradiance source and a phototransistor (photonic sensor) such as the Sharp GP2S27 Photointerrupter or the Siemens SFH9101 Light Reflection Switch can be used as excitation/detection apparatus for the present invention. The LED wavelength and window optical potting (spectral filter characteristics) of these devices can be customized for use with the embodiments of the present invention.

A series of different tags (e.g., 10 to 20) can be formulated for a particular user such as a software manufacturer, with each formulation having different phosphorescent materials and therefore different photoluminance decay characteristics. The decomposition and reverse engineering required to reformulate a latent illuminance tag of the present invention is difficult. In the event that such a security break does occur, however, the software manufacturer can switch to another tag having a different signature. These other signatures would be programmed or encrypted into the drive's firmware as a recognizable latent illuminance tag.

Figure 12:
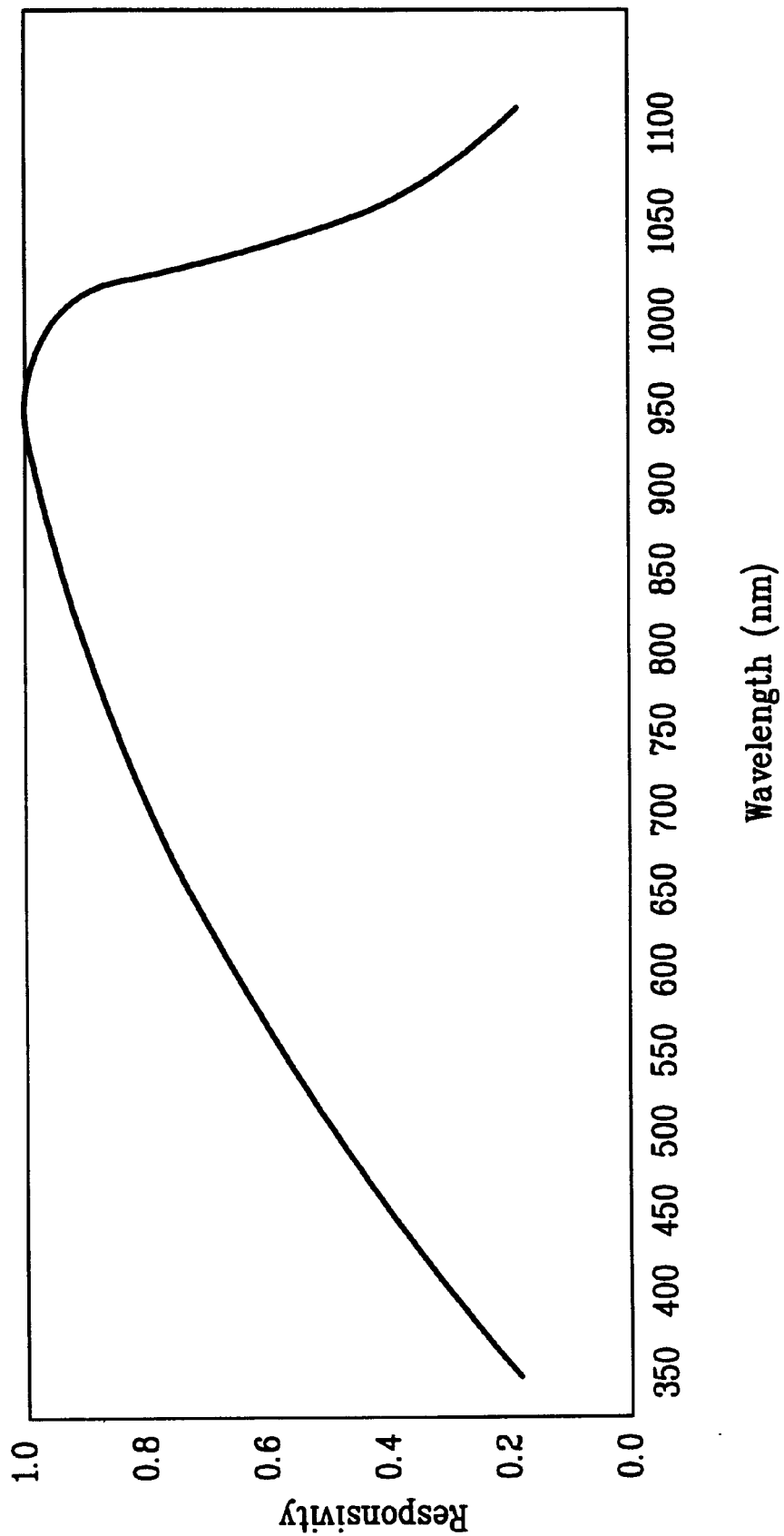
FIG. 12 shows the spectral responsivity (normalized) of a conventional silicon photosensor.

As stated above, it is most preferred that the latent illuminance wavelength be the same as the emitted source. Secondarily, when using a series of different tags, it is preferred that all the tag types' latent illuminance be of the same peak wavelength within the responsivity of spectrum of silicon (450 nm to 1050 nm) and preferably nearer to the peak response of silicon (950 nm). At a minimum, the latent illuminance wavelength of the tag types preferably are within the response spectrum of silicon (450 nm to 1050 nm). FIG. 12 shows the spectral responsivity (normalized) of a typical silicon photosensor. It is also desirable for the FWHM spectral bandwidths to be as narrow as possible.

The time constant for different generations of cartridges can be produced by using different phosphor compounds which inherently have different latent illuminance decay rates due to their photoreactive chemistry or a single phosphor compound can be used whereby the tag is doped with significantly higher levels of active phosphorescent compound such that the time to decay to the drive detection threshold level is increased an appropriate amount of time. An appropriate amount is a large enough increase in the time constant such that the system tolerances can be allowed for in the system and do not cause overlap in the time constant discrimination windows for various cartridge generations.

In one embodiment of the present invention, at least three phosphorescent compounds with differing latent illuminance decay constants are used to identify three generations of a product. Table 1 specifies the decay time constant for the three exemplary types of tags. The table also provides numerical time values for the detection window for each type of tag. This table is not intended to be an absolute requirement for materials, but rather an example of a workable set of time constants for the exemplary family of three compounds. It is further preferred that 1) the shortest time constant of the family of compounds is at least 150 μsec, 2) the longest time constant is less than 100,000 μsec. 3) the three tags' "system time window of discrimination" (Tmax–Tmin) for the detection system do not overlap, and 4) tolerance on the decay time constant is +/–5%. Exemplary Tmin, Tmax, and ΔT are shown in FIG. 4.

TABLE 1

| Tag No. | "T" Decay time constant (μsec) | "T" tolerance (±%) | Tmin (μsec) | Tmax (μsec) | ΔT window (μsec) |
|---|---|---|---|---|---|
| 1 | 150 | 5 | 120 | 345 | 225 |
| 2 | 500 | 5 | 400 | 1000 | 600 |
| 3 | 1300 | 5 | 1050 | 2400 | 1350 |

A series of phosphorescent compounds is used which produces a latent illuminance after being illuminated by an LED source having a visible to near-IR wavelength. The latent illuminance is within the same wavelength band as the stimulating source. This family of compounds preferably has a different decay time constant for the latent illuminescence for each of the members of the family. The difference in the decay times is used as a discriminator between a particular member of the family and others and between the particular member and other purely passive light reflectors.

One embodiment in accordance with the present invention incorporates a filter to spectrally filter out the illuminating wavelength at the aperture of the photonic sensor and only transmit the wavelength(s) that are to be emitted by the phosphorescent effect of the tag. This reduces the recovery time required by the photonic sensor to come out of saturation and makes the system less sensitive to ambient light sources.

Another feature in accordance with the present invention is the use of a filter, preferably a high pass electronic filter or a notch filter, on the detection circuit to filter out ambient light at both DC (sunlight) and 50–60 Hz (electric lights). This prevents noise from affecting the decay signal. Because decay times for the embodiments described above are on the order of approximately hundreds of microseconds (faster than 1 KHz), this type of filtering is straightforward and low cost. Moreover, the excitation light source, the photonic sensor, and the phosphorescent tag detection environment are preferably shielded from ambient light. The above described filters can be incorporated into the system diagram of FIG. 6 as optional element 48.

Although the present invention has been described herein with respect to cartridge detection, it can be used in any object detection or discrimination apparatus or application, such as anti-counterfeiting apparatus and applications.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A cartridge for a data storage drive which has a source of irradiance at an irradiance wavelength and a detector of irradiance for determining whether the cartridge is suitable for use in said drive, comprising:
    a body;
    a data storage medium in said body; and
    a marker on said body, said marker being a phosphorescent material which absorbs irradiance from said source and emits irradiance having an initial value toward said detector for detection which thereby identifies said cartridge as being suitable for use in that drive.

2. The cartridge of claim 1, wherein said marker has a latent illuminance wavelength in the range between 450 nm and 1050 nm.

3. The cartridge of claim 2, wherein said marker has a latent illuminance wavelength substantially similar to said irradiance wavelength.

4. The cartridge of claim 1, wherein said phosphorescent material has a decay time which is used to identify said cartridge.

5. The cartridge of claim 4, wherein said decay time is in the range between about 150 μsec and about 100,000 μsec.

6. The cartridge of claim 4, wherein said decay time is the time it takes said irradiance from said marker to decay to 10% of said initial value.

7. The cartridge of claim 1, wherein said phosphorescent material is coated on a pressure sensitive sticker substrate.

8. The cartridge of claim 1, wherein said phosphorescent material is blended with an ink and printed on said body.

9. The cartridge of claim 1, wherein said phosphorescent material is injection molded on said body.

10. The combination of a data storage drive and a cartridge for said drive, said drive comprising:
    a source of irradiance;
    a detector of irradiance;
    means for enabling said drive when said detected irradiance indicates a predetermined decay time,
said cartridge comprising:
    a body;
    a data storage medium in said body; and
    a phosphorescent marker on said cartridge, said detector being connected to enable said means for enabling said drive when light from said phosphorescent marker indicates said predetermined decay time, said light having an initial value.

11. The combination of claim 10, wherein said source and said detector are closely spaced.

12. The combination of claim 10, wherein said source is a light emitting diode (LED).

13. The combination of claim 10, wherein said detector is a phototransistor.

14. The combination of claim 10, wherein said data storage drive further comprises monitoring means for monitoring the output of said detector and determining a decay time of said phosphorescent marker.

15. The combination of claim 14, wherein said decay time is a period of time in which said light from said phosphorescent marker decays to 10% of said initial value.

16. The combination of claim 10, wherein said data storage drive further comprises a filter for filtering predetermined wavelengths from entering said detector.

17. The combination of claim 10, wherein said phosphorescent marker has a decay time in the range between about 150 μsec and about 100,000 μsec.

18. The combination of claim 10, wherein said phosphorescent marker is an indicator of whether said cartridge is correct and compatible for use in said drive.

19. The combination of claim 10, wherein said phosphorescent marker emits a spherical pattern of light so that at least a portion of said spherical pattern impinges on said detector.

20. The combination of claim 10, further comprising:
    a plurality of said sources to irradiate light at different wavelengths; and a plurality of said detectors to detect light at different wavelengths, whereby the detection of particular ones of said different wavelengths identifies a type of cartridge.

21. A method for determining the type of a data storage cartridge for use with a data storage drive, comprising the steps of:
(a) inserting said data storage cartridge having a phosphorescent marker into said drive;
(b) illuminating said phosphorescent marker for a predetermined time; and
(c) monitoring emitted light having an initial value from said phosphorescent marker to determine a decay time, said decay time uniquely identifies said cartridge.

22. The method of claim 21, wherein said decay time is a period of time in which the emitted light from said phosphorescent marker decays to 10% of said initial value.

* * * * *